N. B. WALES.
CLOSURE AND GAGE SUPPORT FOR LIQUID CONTAINERS.
APPLICATION FILED JAN. 8, 1917.
1,237,426. Patented Aug. 21, 1917.
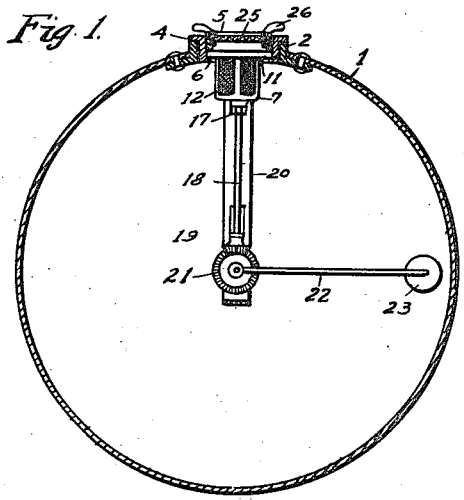
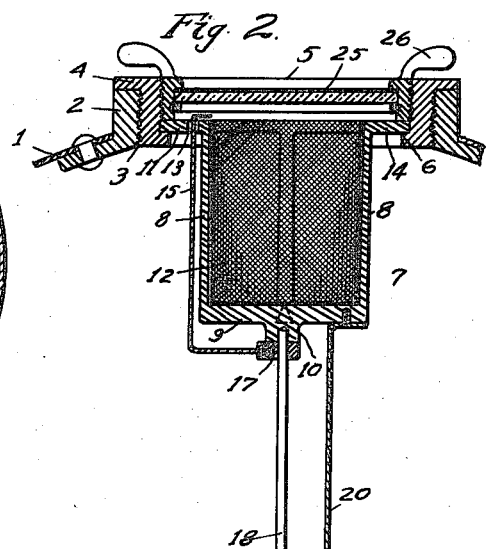
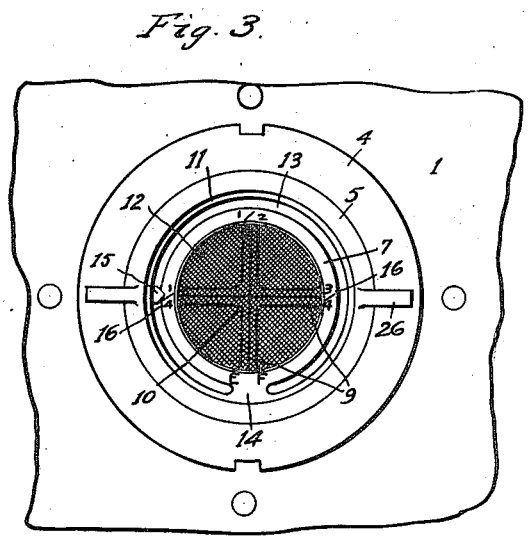
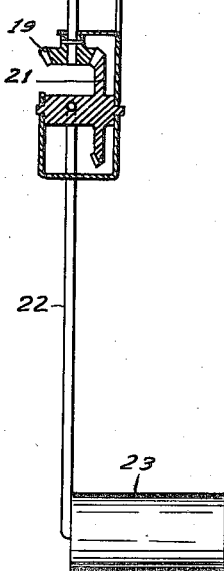
WITNESSES:
INVENTOR
Nathaniel B. Wales.
ATTORNEY

UNITED STATES PATENT OFFICE.

NATHANIEL B. WALES, OF DETROIT, MICHIGAN, ASSIGNOR TO WILLIAM R. PIERCE, OF DETROIT, MICHIGAN.

CLOSURE AND GAGE-SUPPORT FOR LIQUID-CONTAINERS.

1,237,426.　　　　　Specification of Letters Patent.　　Patented Aug. 21, 1917.

Application filed January 8, 1917. Serial No. 141,105.

*To all whom it may concern:*

Be it known that I, NATHANIEL B. WALES, a citizen of the United States, residing at Detroit, in the county of Wayne and State of Michigan, have invented a new and useful Closure and Gage-Support for Liquid-Containers, of which the following is a specification.

This invention relates to caps or closures for the filling openings of liquid containers and especially to containers in which such opening is employed for the insertion and support of a liquid level indicator, and it consists in the construction and arrangement of parts as hereinafter set forth and claimed.

It is common in liquid fuel containers for motor vehicles to mount in the filling opening of the container a liquid level gage which is secured therein and inclosed by a screw cap having a transparent sight window through which the indicia of the gage may be read. With this arrangement it is necessary when filling the container to remove the cap and withdraw the gage in order to admit the liquid. To avoid the necessity of removing the gage when filling the container and to provide simple and effective means to support the gage within the filling opening so as not the obstruct or interfere with the free inflow of the liquid therethrough, and to enable the gage to remain operative to indicate the liquid level when filling the container as well as when closed and in the normal condition, are the principal objects of the present invention.

In carrying out this invention the above objects are attained by the construction and association of parts, a preferred embodiment of which is illustrated in the accompanying drawings, and in which, Figure 1 is a transverse vertical section through a container or tank showing the liquid level gage supported upon a cylindrical cage seated in and depending from the filling opening within the container.

Fig. 2 is an enlarged vertical section through the container cap and filling opening with the depending cage seated therein and carrying the gage mechanism.

Fig. 3 is a plan view showing the face or dial of the gage within the filling opening surrounding the open end of the cage and having indicia thereon with which the index hand of the gage registers in swinging around said cage through a concentric opening in the laterally flanged end wall thereof.

Referring to the parts by the corresponding characters of reference marked on the drawings, 1 indicates a cylindrical tank such as is commonly used for containing the supply of liquid fuel for motor vehicles and which is provided through a boss 2 secured in the wall thereof with the usual inlet or filling opening 3 having screwthreaded therein an annular flanged nut or bushing 4 which is interiorly screwthreaded for the reception of a closing cap or plug 5. This bushing is provided at its inner end with an inwardly extending annular shoulder 6 upon which it is common to removably seat and support the dial and actuating mechanism of a liquid level gage which is ordinarily so arranged as to obstruct the opening and necessitates the withdrawal of the gage with the removal of the inclosing cap to permit the filling of the tank through said opening.

In the present invention the above operation is avoided and the gage is supported within the filling opening so as not to obstruct the passage of the liquid therethrough and to remain operative to indicate the level of the contents of the tank at all times by the following arrangement of parts: 7 represents a cylindrical cage, the skeleton or frame of which consists of circumferentially spaced parallel ribs 8 joined at the bottom by transverse ribs 9 radiating from a central boss or hub 10. The upper open end of the cage is surrounded by a laterally extending annular flange 11 connecting the ends of the ribs 8, and which seats upon and is confined in engagement with the shoulder 6 of the bushing 4 by the inner end of the cap 5. The cage is thus supported to depend concentrically within the filling opening through said bushing so as to extend the lower end thereof into the supply tank sufficiently to admit of the entrance of a funnel or nozzle into said cage and permit the liquid to flow therethrough when filling the tank, and to prevent the passage of sediment into the tank the interior of the cage may be provided with a cylindrical cup shaped screen 12 to serve as a strainer.

Formed vertically through the flange 11 is an arcuate slot 13 extending around the cage except for a portion 14 which abridges said slot and serves to support said cage concentrically therewith, and extending through this slot is a swinging index arm 15 adapted to register with indicia 16 inscribed at intervals on the upper face of the inner arc of said flange in the manner of a dial to indicate the variations of the liquid level in the tank. The lower end of this arm is extended inwardly below the lower end of the cage and is secured by a collar 17 to a vertical shaft 18 which extends axially of the cage and is journaled at its upper end in the hub 10 thereof. The opposite end of this shaft, which carries a beveled pinion 19, is supported by a bracket 20 suitably secured to depend from the cage and which also carries in mesh with said pinion a beveled gear 21 having secured to the hub thereof a laterally projecting arm 22 carrying a float 23 to operate with the rise and fall of the liquid level for imparting movement to turn said shaft and swing the index arm in a manner common in liquid level indicators.

The cap or plug is provided with a transparent window 25, through which the dial of the gage may be read, and also with gripping wings 26 by which said cap may be turned to open and close the filling opening.

It will be apparent that by the above arrangement the gage may be operably supported to remain readable within the filling opening without interfering with the filling of the tank, and that it may be readily withdrawn for repair or replacement with the removal of the closing cap.

I claim:—

1. In combination with a liquid container having a filling opening, a cylindrical cage mounted in said opening to depend into said container, said cage being open to admit liquid therethrough and having indicia displayed upon the end thereof within said opening, and gage mechanism mounted axially on said cage and operable concentrically thereof to register with said indicia and indicate the liquid level in said container.

2. In combination with a liquid container having a filling opening, a cylindrical cage mounted concentrically in said opening to depend into said container, said cage having a peripheral dial provided with indicia readable through said opening, and gage mechanism suspended from said cage and carrying an index arm movable around said cage to register with the indicia of said dial and indicate the liquid level in said container.

3. In combination with a liquid container having a filling opening, a cylindrical cage having an open flanged end seated in said opening to support said cage concentrically therein and within said container, a transparent closure for said opening engaging said flange, said flange having indicia thereon readable through said closure and provided with an arcuate slot therethrough concentric with said cage, and gage mechanism suspended axially from said cage and carrying an index arm operable through said slot to register with said indicia and indicate the liquid level in said container.

4. In combination with a liquid container having a filling opening, a closure for said opening having a transparent window therein, an open cylindrical cage seated concentrically in said opening and secured thereon by engagement with said closure to depend into said container, said cage having a surrounding dial spaced concentrically in said opening and provided with indicia readable through said closure, and gage mechanism supported in said container and carrying an indicator movable around said cage and dial to register with the indicia thereof and indicate the liquid level in said container.

5. In combination with a liquid container having a filling opening provided with an inner annular shoulder, a closure for said opening having a transparent window therein, a cylindrical cage having an annular flanged end embraced between said shoulder and said closure and supporting said cage concentrically in said opening within said container, said flanged end having a passage therethrough concentric with said cage and provided with indicia readable through said window, an index arm mounted axially on said cage and movably extending through said passage to register with said indicia, and float actuated means operably connected with said arm for imparting movement thereto with the rise and fall of the liquid level in said container.

In testimony whereof I sign this specification.

NATHANIEL B. WALES.